United States Patent [19]
Macedo et al.

[11] Patent Number: 6,111,219
[45] Date of Patent: Aug. 29, 2000

[54] SHIELDING GAS MIXTURE FOR GAS-METAL ARC WELDING

[75] Inventors: William de Abreu Macedo; Ricardo de Castro Torres, both of Rio de Janeiro, Brazil

[73] Assignee: Praxair Technology, Inc., Dunbury, Conn.

[21] Appl. No.: 09/317,370

[22] Filed: May 24, 1999

[51] Int. Cl.$^7$ .................................................. B23K 9/173
[52] U.S. Cl. ..................................... 219/137 WM; 219/74
[58] Field of Search .................................. 219/137 WM, 219/74, 75; 228/219

[56] References Cited

U.S. PATENT DOCUMENTS

| | | | |
|---|---|---|---|
| 2,939,942 | 6/1960 | Scheil | 219/74 |
| 3,066,215 | 11/1962 | Espy | 219/74 |
| 3,149,220 | 9/1964 | Soulary et al. | 219/74 |
| 5,306,358 | 4/1994 | Lai et al. | 219/74 |
| 5,739,503 | 4/1998 | Rouault et al. | |

OTHER PUBLICATIONS

N. Stenbacka et al., "Shielding gases for gas–metal arc welding of stainless steels", Scandinavian Journal of Metallurgy 16 (1987) pp. 229–232.

K.A. Lyttle et al., "Select the Best Shielding Gas Blend for the Application"; Welding Journal, Nov. 1990.

W. Lucas, "Shielding Gases for Arc Welding—Part I", Welding & Metal Fabrication, Jun. 1992, pp. 218–225.

J. Medford, "Shielding Gases for Stainless Steels", Australasian Welding Journal, Second Quarter 1993, pp. 12–15.

*Primary Examiner*—Clifford C. Shaw
*Attorney, Agent, or Firm*—Donald T. Black

[57] ABSTRACT

A shielding gas mixture for gas-metal arc welding of austenitic stainless steel is provided in which the gas mixture comprises from about 2 to about 5% carbon dioxide, from about 1 to about 4% nitrogen, and the balance being argon. Also, a process for welding austenitic stainless steel is provided by forming an electric arc between a nonconsumable electrode and the workpiece and in which the gas mixture is used.

4 Claims, No Drawings

SHIELDING GAS MIXTURE FOR GAS-METAL ARC WELDING

FIELD OF THE INVENTION

This invention is generally related to a gas mixture for arc welding. More specifically, this invention is related to a shielding gas mixture for gas-metal arc welding of austenitic stainless steel.

BACKGROUND OF THE INVENTION

The performance of the presently existing shielding gases for gas metal arc welding of austenitic stainless steels is normally optimized for specific situations such as welding positions and metal transfer modes. In welding shops, materials of a variety of thickness may be found and depending on the equipment or structure being manufactured, it is necessary to weld metals in different positions. The need for changing the shielding gas, according to material thickness, metal transfer mode and welding position dramatically affects the operation and therefore productivity in welding shops. Another important consideration is that every year, billions of dollars are spent worldwide in an effort to reduce and minimize corrosion problems and most of them are related to welded joints failures. International standards normally do not require any corrosion evaluation for the qualification of welding procedures for the 300 series austenitic stainless steels.

The mixtures currently available in the market had been developed by taking into consideration only specific objectives such as bead appearance, welding travel speed and mechanical properties. Besides that, the gas mixtures recommended for such materials do not perform equally in all modes of metal transfer, requiring very skilled welders or optimized arc welding equipment to ensure good results.

Various literatures have been provided in the field relating to shielding gas mixtures. Representative examples include: U.S. Pat. No. 5,739,503; N. Stenbacka et al., "Shielding Gases for GMAW of Stainless Steels", Scandinavian Journal of Metallurgy; Lyttle et al., "Select the Best Shielding Gas Blend for the Application", Welding Journal-November, 1990; W. Lucas, "Shielding Gases for Arc Welding-Part I", Welding and Metal Fabrication, June, 1992; and J. Medforth, "Shielding Gases for Stainless Steels", Australian Welding, second quarter, 1993, pp. 12–15. Nevertheless, none of the art, by itself or in any combination, is believed to lead to superior corrosion resistance and mechanical properties for welded joints and for superior stability.

It is therefore an object of the invention to develop a new gas mixture for the gas-metal arc welding of austenitic stainless steels that would enable higher productivity, enhance mechanical properties and corrosion resistance of welded joints.

SUMMARY OF THE INVENTION

One aspect of this invention is directed to a shielding gas mixture for arc welding of austenitic stainless steel in which the mixture comprises from about 2 to about 5% carbon dioxide; from about 1 to about 4% nitrogen; and the balance being argon. Such mixture may comprise of about 3% carbon dioxide, about 2% nitrogen; and the balance being argon.

Another aspect of this invention is directed to a process for arc welding austenitic stainless steel which comprises the steps of forming an electric arc between a nonconsumable electrode and the workpiece; and at least partially shielding the arc with a shielding gas mixture comprising from about 2 to about 5% carbon dioxide, from about 1 to about 4% nitrogen, and the balance being argon. In a preferred embodiment, the shielding the arc is carried out with a shielding gas mixture comprising about 3% carbon dioxide, about 2% nitrogen and the balance being argon.

DETAILED DESCRIPTION OF THE INVENTION

This invention is directed to a multi purpose gas mixture for gas metal arc welding. This gas mixture blends austenitic stainless steels, and is suitable for all modes of metal transfer regardless of conventional or electronic power sources being used, with enhanced mechanical properties and corrosion resistance as compared to the presently existing gas mixtures. Through the use of this new gas mixture in this application, it is possible to replace the high cost wires and stick electrodes containing nitrogen, which are intentionally added in their chemical composition class by the common austenitic stainless steels wires for joining the austenitic stainless steels.

The new shielding gas mixture for gas-metal arc welding of austenitic stainless steels in this invention ensures excellent corrosion resistance and superior mechanical properties to welded joints. This new mixture also allows excellent arc stability in all welding positions both for manual and automatic welding as well as for outstanding bead appearance. The gas-metal arc welding process is defined as an arc welding method through which an electric arc is established between a consumable wire electrode continuously fed to this arc as it is moved along the joint to be welded and the work piece.

The arc and weld pool are protected by a shielding gas from the atmospheric contaminants. This shielding gas, as provided in the present invention, contains from about 2% to about 5% carbon dioxide, preferably about 3% carbon dioxide, from about 1% to about 4% nitrogen, preferably 2% nitrogen, and the balance being argon.

The development work that generated this invention aimed to evaluate the performance of many existing shielding gases for gas metal arc welding of austenitic stainless steels and to identify a new composition that would provide higher versatility to the welding process, better mechanical properties and enhanced corrosion resistance of the welded joints. AISI '304 and AISI 316 steels were used as base materials and both flux cored and solid wires as filler metals. All the welding was manually done.

Three different thickness for "T" and groove joints, different welding positions and metal transfer modes were adopted for the experimental procedure.

In order to determine this new mixture, an extensive analysis of thirty-four worldwide existing gas mixture compositions was carried out. These gas mixtures were first classified based on the helium content. For the same helium content, they were classified based on $CO_2$ content. Finally, using the same criteria, the gases were classified based on other components such as oxygen, hydrogen and nitrogen.

For each class, numerous gas mixture samples were reproduced in the laboratory and tested to verify welding properties, mechanical properties and metallurgical characteristics.

After this initial phase, the best performing existing gas mixtures were chosen for comparison with the newly developed gas mixture samples.

Tables I and II show the optimized welding parameters used for the qualification of the welding procedures for flat and vertical positions with the new gas blend.

Table I shows the optimized welding parameters for flat position using short circuit and spray transfer.

TABLE I

| Shielding Gas | Pass | Current (V) | Voltage (V) | Wire feed speed (ipm) | Welding travel speed (ipm) | Heat Input (J/in) | Technique |
|---|---|---|---|---|---|---|---|
| 95% Ar + | Root | 126.00 | 19.00 | 264.00 | 6.50 | 35.40 | backhand |
| 3% $CO_2$ + | Filling | 180.00 | 27.00 | 425.00 | 12.00 | 34.30 | forehand |
| 2% N2 | Cover | 170.00 | 26.00 | 425.00 | 9.00 | 47.20 | forehand | where the diameter of filler wire was 0.035".

Table II shows the optimized welding parameters for vertical position using pulsed spray transfer. Mixture 95% Ar+3% $CO_2$+2% $N_2$. vertical down for root pass and vertical up for others.

TABLE II

| Pass | $I_b$ (A) | $T_b$ (msec) | $I_p$ (A) | $T_p$ (msec) | Voltage (V) | Welding travel speed (ipm) |
|---|---|---|---|---|---|---|
| Root | 21.00 | 11.00 | 300.00 | 4.80 | 22.00 | 9.50 |
| Others | 21.00 | 11.00 | 300.00 | 4.80 | 22.50 | 9.40 |

Where the diameter of filler wire was 0.045", $I_b$ is the base current; $T_b$ is the base time; $I_p$ is the peak current; and $T_p$ is the peak time.

After welding, the gas mixture samples were evaluated through a number of analyzes including mechanical testing for the welding procedure qualification based on ASME IX and ASTM A370 codes; metallurgical characteristics (macro and microstructural analysis); corrosion resistance analyses through the polarization curves in two environments, and water solution with 0.9% NaCl and "White Liquor".

Table III shows the results obtained for the tensile test, comparing to the values obtained for the base material and to the specified values for AISI 316 stainless steel.

TABLE III

| Sample | $YS^{(1)}$ kSi (Mpa) | $TS^{(2)}$ Ksi (Mpa) | Elongation (%) | Rupture Location |
|---|---|---|---|---|
| 95% Ar + 3% $CO_2$ +2% $N_2$ | 42.1 (292) 43.7 (303) | 87.4 (606) 92 (638) | 47.00 52.00 | base metal base metal |
| Base metal | 44.8 (311) | 87.2 (605) | 66.00 | — |
| AISI 316 standard | 30 (205) min. | 75 (515) min. | 40 min. | — | where (1) YS is the yield strength; and (2) TS is the tensile strength

Table IV shows the mechanical resistance as well as bend tests results.

TABLE IV

| Sample | $YS^{(1)}$ kSi (MPa) | Bend Test | Results |
|---|---|---|---|
| 95% Ar + 3% $CO_2$ +2% N | 87.4 (660) 92 (638) | without cracks | OK |
| Base metal | 87.2 (605) | — | — | where (1) TS is the tensile strength

The results in the macro and microstructural analysis of the welded joints showed the following effects: 1) there was no sensitization in the low temperature heat affected zone (HAZ) in any of the samples; 2) the weld metal presented an austenitic-ferritic structure with no significantly large variation as compared to the joints welded using conventional mixtures except for the lower delta ferrite content of weld metal; 3) the best mechanical properties obtained (strength and ductility) were generated by a greater micro-structural refining of the weld metal caused by the solidification rate that this new gas mixture provided; and 4) the best ductility values obtained with the argon, carbon dioxide and nitrogen mixture could be associated to the austenitic phase stabilization promoted by the nitrogen from the shielding gas.

The corrosion resistance of the welded joints was evaluated through the polarization curves in two different environments (solution of 0.9% NaCl and "White Liquor"). The method used for the analysis followed the ASTM G5 standard.

Table V shows the corrosion and pitting potential obtained for each environment.

TABLE V

| | Solution | | |
|---|---|---|---|
| | 0.9% of NaCl in water | | "White Liquor" |
| Samples | Corrosion Potential (mV) | Pitting Potential (mV) | Corrosion Potential (mV) |
| 95% Ar + 3% $CO_2$ 2% $N_2$ | −276 | 302.00 | −407 |
| AISI 316 Standard | −240 | 336.00 | −472 |

According to these results, it is possible to conclude that for both solutions, sodium chloride and "White Liquor", the welded joints presented technically the same corrosion potential as compared to the base metal.

As a result, nitrogen additions limited to 5% stabilize the austenite reducing delta ferrite content, increasing in this way, both the ductility and corrosion resistance.

The high solidification rates of the weld pool promote a highly refined microstructure and consequently, better mechanical properties.

The higher ductility promoted by this new gas mixtures was also noticed through the bend tests in which no cracks were found for all test pieces.

The better corrosion resistance results were obtained through the nitrogen addition in the shielding gas with the consequent stabilization of the austenite and reduction of delta ferrite content in the microstructure of the weld metal.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A shielding gas mixture for gas-metal arc welding of austenitic stainless steel which comprises:

a) from about 2 to about 5% carbon dioxide;

b) from about 1 to about 4% nitrogen; and c) the balance being argon.

2. The gas mixture of claim 1 wherein said mixture comprises:

a) about 3% carbon dioxide;

b) about 2% nitrogen; and c) the balance being argon.

3. A process for gas-metal arc welding austenitic stainless steel comprising the steps of:

a) forming an electric arc between a nonconsumable electrode and the workpiece; and b) at least partially shielding the arc with a shielding gas mixture comprising from about 2 to about 5% carbon dioxide, from about 1 to about 4% nitrogen, and the balance being argon.

4. The process of claim 3 wherein the step of shielding the arc is carried out with a shielding gas mixture comprising about 3% carbon dioxide, about 2% nitrogen and the balance being argon.

* * * * *